Oct. 29, 1963 — J. A. GLASSMAN — 3,108,593
SURGICAL EXTRACTOR
Filed March 13, 1961 — 3 Sheets-Sheet 1

INVENTOR.
Jacob A. Glassman
BY
Attorney.

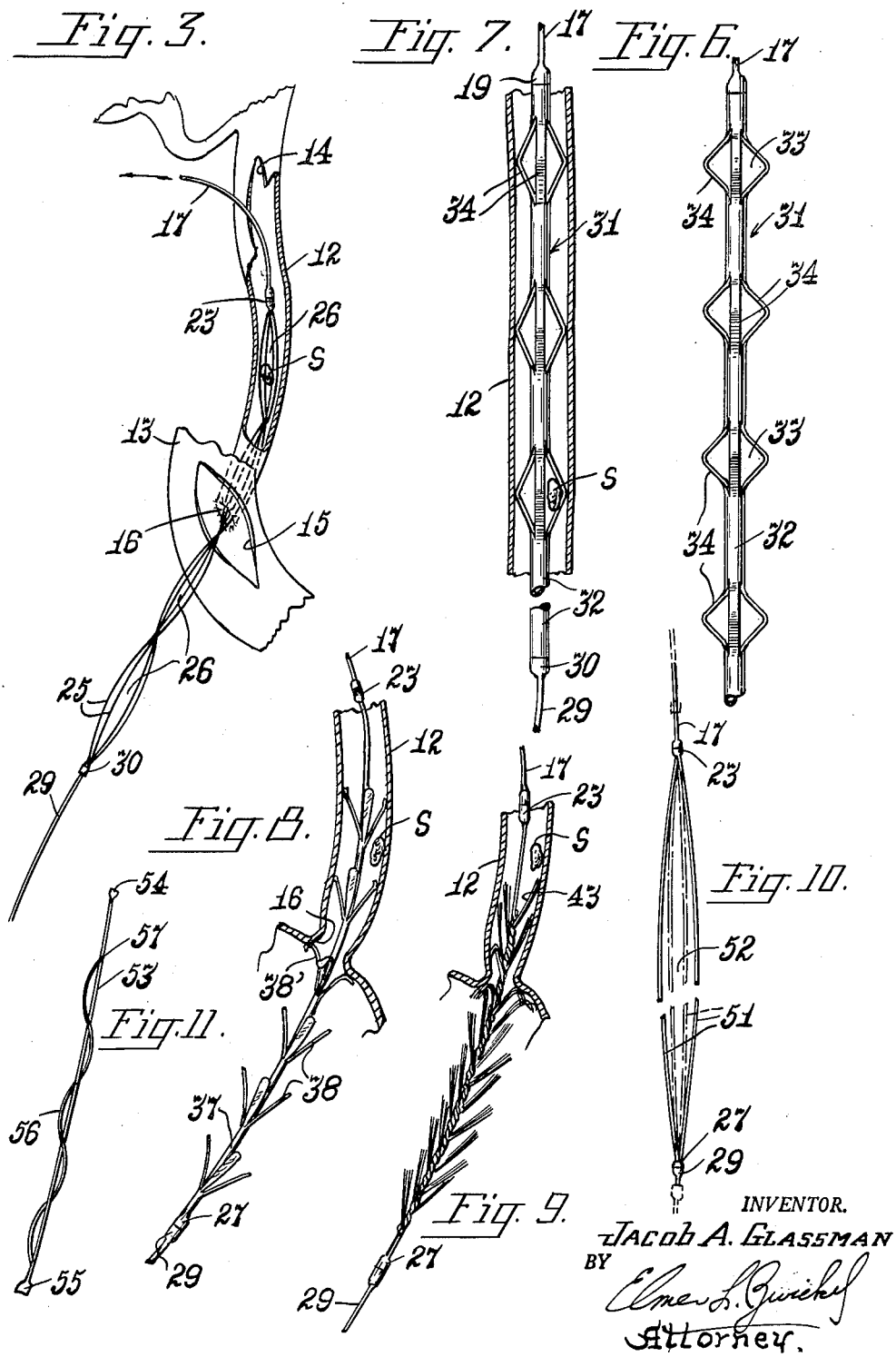

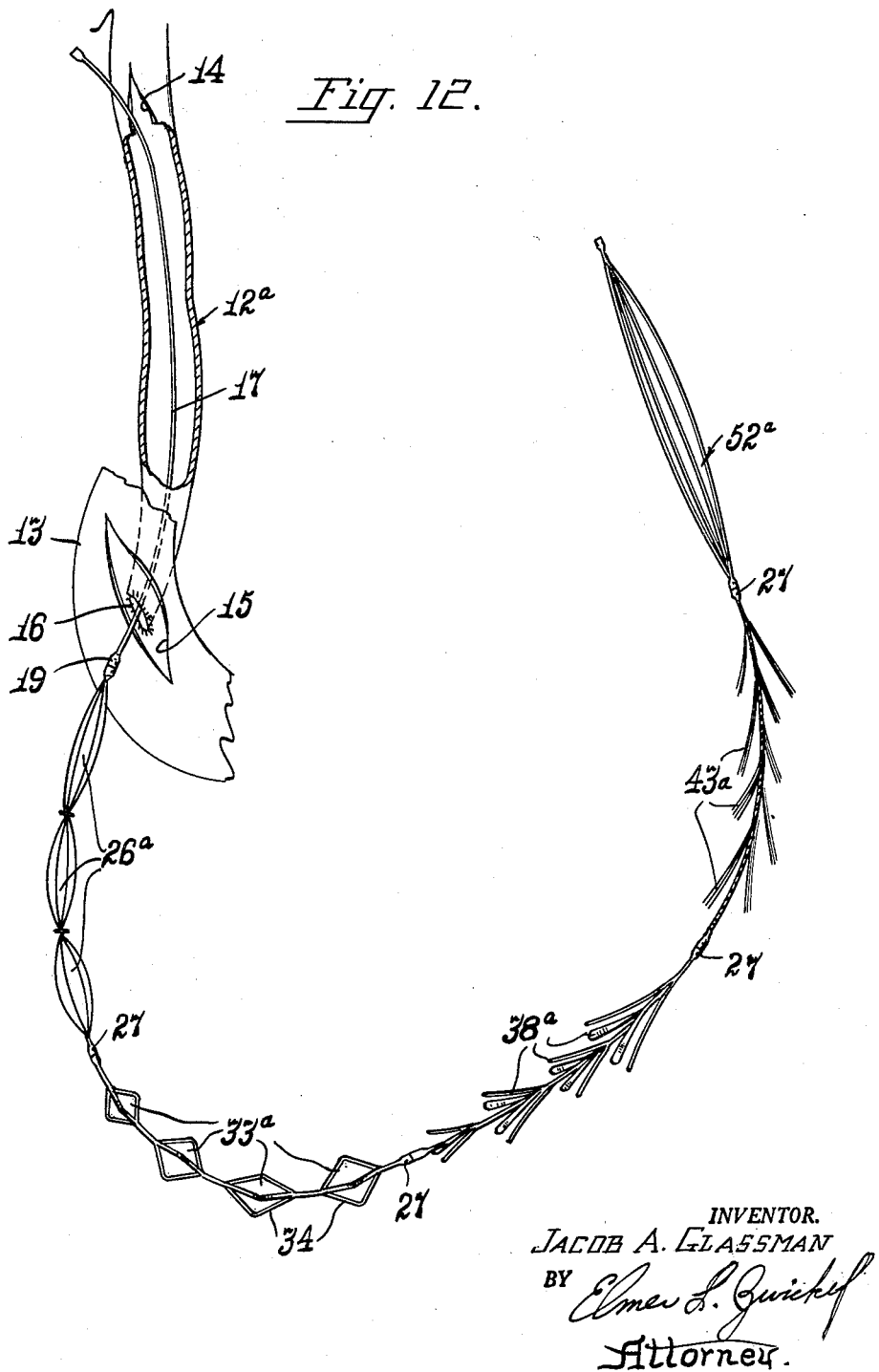

United States Patent Office 3,108,593
Patented Oct. 29, 1963

3,108,593
SURGICAL EXTRACTOR
Jacob A. Glassman, 1680 Meridian Ave.,
Miami Beach, Fla.
Filed Mar. 13, 1961, Ser. No. 95,220
6 Claims. (Cl. 128—328)

The invention relates to improvements in surgical instruments and is more particularly concerned with the novel construction of an instrument for use in the extraction of dislodged gall stones from the common bile duct irrespective to their size or degree of impactness.

More particularly, the novel instrument herein disclosed in several structural embodiments is of a character that is adapted to be drawn upwardly through the common bile duct while tensioned so as to engage with and entrap a gall stone for withdrawal from said duct. The employment of this type of instrument involves the practice of making a high level incised opening in the common bile duct and an incised opening in the duodenum in an area opposite to the termination of said duct in the duodenum for the entrance and exit of the instrument. In the use of the instrument, a fine flexible blunt tipped probe is inserted through the high level incised opening and into the common bile duct, and it emerges through the sphincter of Oddi and is extended out through the incised opening in the duodenum. The tip of the probe is formed to receive securely attached thereto a novel instrument, or a connected series of instruments, which may embody several forms and which is then drawn upwardly into and through the common bile duct while being tensioned at both ends. The construction of the instrument is such that when the instrument is tensioned and moved by short to and fro motions through the duct, a multiplicity of stone engaging and entrapping sections therein embody a stone or stones in such manner as to dislodge it from the bile duct lumen or wall and entrap it snugly within one of the sections. When the instrument is withdrawn from the duct through the high level incision, the entrapped stone is withdrawn with it; also when the instrument is withdrawn from below the stone may likewise be withdrawn into the duodenum.

Known prior types of instruments employed in bile duct stone removal are essentially probes or spoons that are inserted through an incised opening at the upper lever of the common bile duct and either slide by or are necessarily forced past the stone or stones and commonly withdrawn back again through the same incision without successful extraction of the stone or stones. Such procedures are very tedious and prolonged and are fraught with a high morbidity and are very often unsuccessful. The herein disclosed instruments are distinguishable from prior known instruments used for bile duct stone removal primarily in the fact that they each present a structure that affords simple manually controlled means to increase and decrease the size of the stone dislodging and entrapping sections thereof to facilitate their dislodgement and insure entrapment of multi-sized, and faceted gall stones whereas, in such prior instruments no means is provided for such control. Also, prior known instruments are too large, traumatic in character and frequently have single means too often hampered by a central wire or control rod which reduces the efficiency and capacity of the instrument.

It is therefore an object of the invention to provide a novel instrument of the character referred to.

Another object is to provide a stone extraction instrument with novel structural features adapting it to be tensioned while being drawn upwardly or downwardly through the common bile duct in a continuous direction or while being moved to and fro and progressively upwardly.

Another object is to provide a stone extractor of a character having a multiplicity of highly flexible cages or bobbins or other stone dislodging and entrapment sections spaced along its length and capable of being expanded or contracted at will so as to adopt itself to the particular diameter or varying diameters of the common bile duct and to entrap a dislodged stone or stones and effect its withdrawal from the bile duct in an upward or downward direction.

With the foregoing and such other objects and advantages in view, which will appear as the description proceeds, the invention consists of certain novel features of construction, arrangement and combination of parts hereinafter fully described, illustrated in the accompanying drawings, and particularly pointed out in the appended claims, it being understood that various changes in form proportion, size and minor details of the structure may be made without departing from the spirit of the invention.

Referring to the drawings in which the same characters of reference are employed to identify corresponding parts in the several embodiments illustrated:

FIG. 3 is a view similar to FIGS. 1 and 2, showing the instrument partially drawn upwardly into the common bile duct and illustrating a stone entrapped therein.

FIG. 6 is a view illustrating another embodiment of a stone extraction instrument.

FIG. 7 is a view showing the instrument illustrated in FIG. 6, in a position of use within the common bile duct, the latter being shown in section.

FIG. 8 is a fragmentary view of another modified form of instrument, shown partially drawn upwardly into the common bile duct.

FIG. 9 is a view similar to FIG. 8, illustrating still another form of construction.

FIG. 10 is an enlarged detail view of another cage type stone extraction instrument partially broken away.

FIG. 11 is a view illustrating still another form of construction.

FIG. 12 is a view somewhat similar to FIG. 3, but illustrating an interconnected series of novel instruments of various types.

Figure 1:
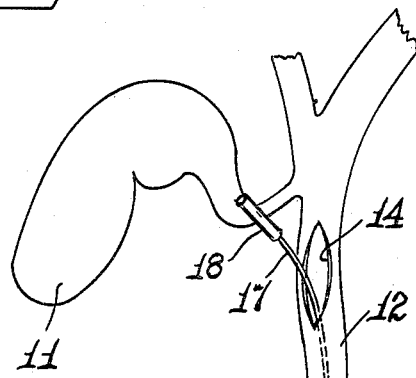
FIG. 1 is a schematic representation of the common bile duct and associated organs, illustrating initial placement of a probe.

Referring generally to the exemplary disclosures in the accompanying drawings, the improved instruments are designed for easy insertion through an incision in the duodenum at the level of the sphincter of Oddi, through the Oddi and common bile duct and then its withdrawal out through a high level incision in the common bile duct. Such manipulation of the instrument is accomplished by initial insertion, through the high level incision of a fine flexible blunt tipped probe that is easily passed downwardly through the common bile duct and the sphincter of Oddi for emergence into the duodenum where it can be viewed through the duodenal incision. The emerging blunt end of the probe is then attached by being threaded, clamped, snapped, sutured, or otherwise secured, to one end of the instrument. The probe is then withdrawn upwardly to carry the instrument through the sphincter of Oddi and into the common bile duct. As previously noted, hereinabove, the instrument embodies means to dislodge and entrap a dislodged gall stone and it is highly flexible and pliable so as to accommodate itself to the sphincter of Oddi and to the variable diameters of the bile duct. When positioned in said duct, it is drawn upwardly through the duct while applying variable resistance to the trailing end as by holding same. The longitudinal pull thus exerted in both directions on the instrument, results in entrapping the stone in the flexible sections in a manner to engage one or more loose stones or to engage and dislodge an impacted stone. The stone enters into the confines of the related section and is entrapped therein whereupon it is withdrawn upon removal of the instrument from the duct either thru the opening in the common duct, or through the sphincter of Oddi. In some instances it may be necessary or advisable to move the instrument in short to and fro circular motions to engage and/or dislodge a stone and then to withdraw the stones from above or below.

The instrument is disclosed herein in several embodiments, but each is characterized by its ability to stretch in a longitudinal direction or otherwise be distorted so as to extend or constrict the stone engaging and entrapping sections thereof and facilitate initial passage through the sphincter of Oddi, close tolerance with the wall of the common bile duct, and final and total dislodgement and entrapment of the obstacle to be removed.

Referring now particularly to the exemplary disclosure in FIGS. 1 through 5, there is illustrated rather diagrammatically, the anatomy of a gall bladder 11 and common bile duct 12, which opens into the duodenum 13. In stone removal by use of the present instrument, an incision 14 is made at a high level in the common bile duct and a second incision 15 is made in the duodenum (duodenostomy) opposite to the site of the sphincter of Oddi 16.

Figure 2:
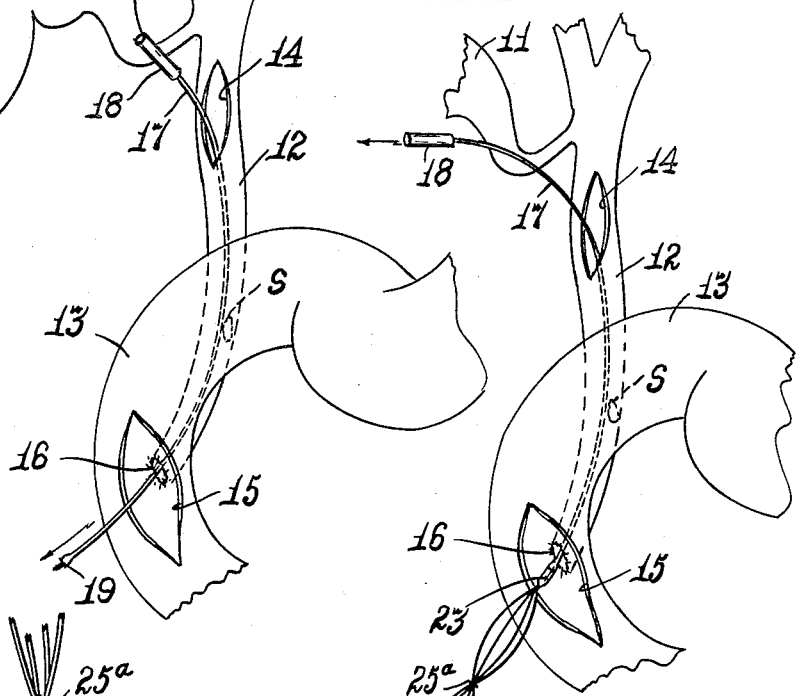
FIG. 2 is a view similar to FIG. 1, showing one embodiment of the novel instrument attached to the probe.
Figure 4:
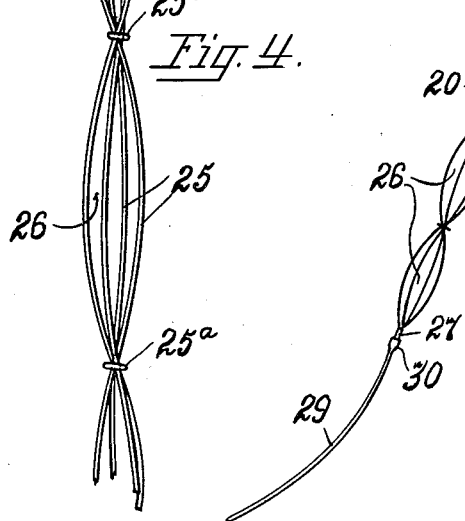
FIG. 4 is an enlarged view showing a portion of the instrument illustrated in FIGS. 2 and 3.
Figure 5:
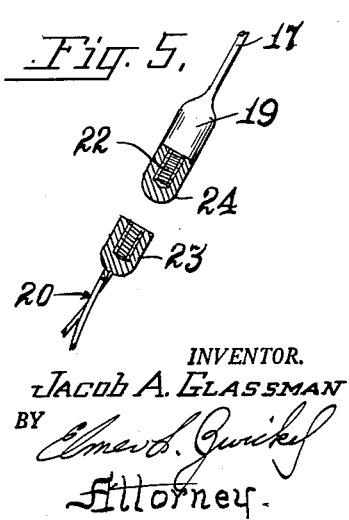
FIG. 5 is an enlarged sectional detail view of the related ends of the probe and instrument, showing them separated and with a removable cap affording a blunt tip for the probe.

A fine double blunt tipped probe, comprised of a length of fine soft flexible metal or spring wire or a woven filiform 17 is provided for insertion through the high level common bile duct incised opening 14 a distance sufficient to carry its leading end out through the sphincter of Oddi and into the lower incised opening of the duodenostomy. The probe may have a handle 18 at one end and is formed at its other or leading end with an element 19 carrying suitable means for the subsequent attachment of the stone dislodging and removing instrument such as that shown at 20, for example. This attachment structure may comprise a threaded stud 22 adapted to be screw threaded into a female element 23 on one end of instrument 20, as best shown in FIGS. 2 and 5. If desired the handle 18 may be omitted and an element 19 may be present at the lower and upper ends of the flexible probe. The stud 22 normally is covered with a removable cap 24 so as to provide a blunt tip on one or both ends of the probe to assist its insertion into the duct; or it may comprise any other suitable means permitting the two elements to be sutured, snapped, clamped or otherwise attached firmly. It is important that fitting 19 and element 23 gradually diminish in size to merge with the respective elements on which they are carried so as to eliminate any shoulder which might interfere with easy passage of the parts through the sphincter of Oddi.

The instrument shown in FIGS. 2 through 5 is comprised of a multiplicity of fine soft spring wires 25 (preferably 4) that are loosely twisted helically one about the other so as to form a series of longitudinally spaced cages or bobbins 26. These wires are secured one to the other at their ends only; that is, where they join female fitting 23 and at a fitting 27 at their other ends. Preferably, loosely fitted rings 25a may be arranged at the intersections of the loosely twisted wires 25 to assist in shape retention. There is thus provided a series of cages 26 that are are subject to longitudinal elongation and circumferential contraction when a pulling longitudinal force is exerted at opposite ends thereof.

Now, with the instrument attached to the probe as aforesaid, the probe is withdrawn slowly and carefully so as to draw the instrument up through the sphincter of Oddi and into the common bile duct. Passage through the sphincter of Oddi is accomplished without damage owing to the flexibility and deformability of cages 26 which may be completely retracted or collapsed by applying resistance to the trailing end of the instrument. Otherwise stated, the operator may grasp handle 18 while retaining hold of the trailing end of the instrument, which, as illustrated in FIG. 2, may be provided with an extention wire 29 connected thereto, as at 30. When so held and stretched, the instrument may be drawn upwardly through the duct in a straight forward direction or by applying a circular and a to and fro motion. In so doing cages 26 may adjust to the varying diameters of the duct and, if desired, the instrument may be rotated to and fro to thereby cause the wires 25 defining the cages to engage and dislodge an impacted stone "S" tangentially with the result that the stone will fall into the area within a cage and be entrapped and withdrawn when the instrument is finally withdrawn from the high level common duct incision, or low level sphincter of Oddi.

Clearly, the high degree of flexibility and resiliency in the instrument and the presence of a plurality of cages therealong, adapts it to easy harmless passage through the sphincter of Oddi and common bile duct and insures adequate, firm, non-injurious engagement with an obstacle in the duct and dislodgement thereof, irrespective of its degree of impactness, and its entrapment in one of the multiplicity of cages provided.

Referring now to the instrument 31 disclosed in FIGS. 6 and 7, and which is used in the same manner as the one described hereinabove, said instrument is fabricated from a suitable resiliently flexible material, such for example as rubber or nylon plastic. It preferably comprises a thin walled resiliently deformable tubular body 32 of small diameter having a plurality of longitudinally spaced cages 33 each defined by circumferentially spaced thin strips 34 each formed of a portion of the tubular wall as by slitting said wall at circumferentially spaced intervals. The strips 34 are permanently deformed outwardly medially, as perhaps is best shown in FIG. 6 so as to define cages 33. The ends of the tubular body 32 are formed with probe and trailer wire connectors as in the previously described instrument, which connectors are identified by like numerals. Although the body 32 preferably is tubular, it may be solid in its construction and the cages 33 therein may be molded or otherwise formed therealong.

When the instrument 31 is drawn upwardly through the sphincter of Oddi and into the common bile duct it is stretched longitudinally so as to constrict the normal extended position of strips 34 and adapt cages 33 to the internal diameter of the duct. By pulling the instrument upwardly through the duct, either in a continuous slow motion or by a to and fro motion, and with slight rotation, any stone "S" encountered is engaged by an edge of one of strips 34 and is dislodged if impacted, and the stone finally comes to rest within one of said cages 33 and is extracted from the duct when the instrument is drawn out of the high level incision.

FIG. 8 also discloses a very efficient instrument 36 for stone extraction. This instrument, like those hereinabove described, is formed on its ends to receive connection with probe and/or trailing wires and like numerals identify corresponding parts. This instrument comprises essentially a resiliently flexible shaft 37 of any suitable plastic material or fusiform metal and it has shape retaining resiliently flexible prong like fingers 38 longitudinally spaced apart therealong and disposed in clusters circumferentially so as to define a series of spaced apart groups of protuberances normally extended radially distances greater than the opening of the sphincter of Oddi. However, when the instrument is drawn through the sphincter of Oddi and into the common bile duct, as illustrated in FIG. 8, the clusters of fingers 38 are successively distorted or turned downwardly, as at 38′, and because of their inherent resiliency they return to their original forwardly extending condition and engage the internal surfaces of the duct wall. When advanced through the duct, in a straight forward or to and fro motion, with or without rotational movement, one or more of said fingers 38 will engage and dislodge an impacted stone "S" which will be entrapped in the respective cluster and carried out of the high level opening when the instrument is withdrawn upwardly.

The FIG. 9 disclosure of instrument is similar to the FIG. 8 disclosure in its function and operation. However, here a single or multi-strand flexible body 42 or stem is provided. This may comprise fine steel wire or plastic filaments. In either event, a multitude of bristles 43 of plastic material such as nylon, are arranged in bunches and adhered to body 42 by being twisted into the flexible strands thereof. One or both ends of the body carries the attachment element 23 for securement to the end of the probe 17. When this instrument is drawn into the sphincter of Oddi, the bristles are flexed downwardly to facilitate its entrance without damage and when within the duct said bristles are restored to their forwardly directed positions so as to provide a multitude of means that act on and dislodge stone "S" which is then carried out of the duct when the instrument is removed therefrom at the high level incision.

FIG. 10 illustrates a single cage type instrument comprised of long untwisted wire strands 51 normally bowed to provide a single cage 52 and provided at its ends with fittings 23, 27, for attachment to the probe and trailing leads 17, 29 respectively. This structure is capable when being stretched longitudinally, of having a minimal cross sectional area and, when the stretching pressure is relieved, the strands 51 are urged outwardly radially into contact with the duct wall and are effective to dislodge and entrap within the cage any stone or stones upon being drawn through the duct in a twisting direction.

FIG. 11 is a representative illustration of a stone dislodging and extracting instrument wherein a single multi-strand thin flexible body 53 having fittings 54 and 55 at its ends are entwined loosely by a spirally wound fine resiliently flexible strand 56 that is secured to said body at its leading end 57 only and therefor is capable of adjusting its circumferential dimension to the sphincter of Oddi and duct diameter. Passage of this instrument upwardly through the common bile duct is effective to loosen and entrap a stone within the helices thereof, which stone then is extracted when carried out through the high level opening.

FIG. 12 is representative of a suggested combination of the instruments hereinabove disclosed. As shown a series of instruments of the various types illustrated are connected end to end so as to provide a multitude of different stone engaging and retrieving units. Such combination of two or more different types of instruments may be required in instances of difficult or multitude stone removal, or in instances where, as shown, the common bile duct 12a has varying internal diameters. The instruments illustrated in this combination of instruments have been modified slightly for purposes of disclosure by forming each with stone engaging cages or bristles 26a, 33a, 38a, 43a or 52a of different sizes to better adopt them to the variable common bile duct diameter, although it should be understood that they may be identical to those hereinabove disclosed.

What I claim is:

1. A surgical instrument comprised of an elongated body fabricated from resiliently stretchable plastic material, a plurality of longitudinally spaced groups of longitudinally extending circumferentially spaced slots in said body defining strip portions between the slots, said strip portions being disposed normally radially out of the circumferential plane of said body when the body is in a non-stretched condition so as to define a series of longitudinally spaced cages of predetermined size with the gaps between the strips communicating with the interior of the cages, said strip portions being carried inwardly radially when the body is stretched longitudinally to restrict the effective size of said cage and to narrow the gaps between said strips, and means on the opposite ends of said body for applying successive pull forces simultaneously to said ends and thereby to the opposite ends of said cages as effects restriction and subsequent expansion of the cages.

2. The surgical instrument recited in claim 1, in which a probe is attached to at least one end of said body and provides the means on said one end for applying pull forces to said body.

3. A surgical instrument comprised of an elongated body fabricated from resiliently stretchable thin walled tubular plastic material, a plurality longitudinally spaced groups of longitudinally extending circumferentially spaced slots in the wall of said body defining narrow strips between them, said strips being disposed normally out of the circumferential plane of said body so as to define a series of longitudinally spaced cages of predetermined size with the gaps between the strips communicating with the interior of the cages, said strips being carried inwardly radially when the body is stretched longitudinally to restrict the effective size of said cages, and means on the opposite ends of said body for applying a succession of pull forces simultaneously to said ends and thereby to the opposite ends of said cages as effects restricting and expanding movement of the cages.

4. A common bile duct stone dislodging and extracting instrument comprising, in combination: elongated flexible means adapted to be inserted through a high-level incised opening in the bile duct and thence passed longitudinally through said duct into the duodenum and thence outwardly therefrom through an incised opening provided therein and having length such that when so placed its opposite ends will project from said bile duct and duodenum, respectively; an elongated thin flexible core member extending in its in-use position in continuation of said means; and coacting means on the distal end of the first means which projects from the duodenum and on the adjacent end of said core member for detachably connecting said first means and core member for longitudinal movement in unison; said core member incorporating in its length at least one normally radially expanded stone dislodging and entrapping cage-like element adapted to be constricted when pull forces are applied simultaneously to the opposite ends of said means; the construction and arrangement being such that said core member may be drawn through the bile duct in response to retracting movement of said first means and that during the course of said movement the cage-like elements may be successively constricted and expanded by applying pull forces simultaneously to the remotely related ends of said first means and said core member.

5. A common bile duct stone dislodging and extracting instrument comprising, in combination: elongated flexible means adapted to be inserted through a high-level incised opening in the bile duct and thence passed longitudinally through said duct into the duodenum and thence outwardly therefrom through an incised opening provided therein and having length such that when so placed its opposite ends will project from said bile duct and duodenum respectively; an elongated, highly flexible rod-like member extending in its in-use position in continuation of said means; and means for detachably connecting the adjacent ends of said first means and said member; said rod-like member incorporating a plurality of integral stone dislodging and entrapping normally expanded cage-like elements disposed in mutually spaced apart relation along its length and all adapted to be contracted by pull forces applied simultaneously to the opposite ends of said member, the construction and arrangement being such that said rod-like member may be drawn through the bile duct in response to retracting movement of said first means and that during the course of such movement the cage-like elements may be successively contracted and expanded by pull forces simultaneously applied to the remotely related ends of said first means and said rod-like member.

6. A common bile duct stone dislodging and extracting instrument comprising, in combination, a thin flexible probe terminating at one end in a tip and having length substantially greater than the length of the common bile duct of an adult person of average size whereby when inserted tip-end first through a high level incised opening in said bile duct and thence threaded through the duct into the duodenum and thence outwardly through an incised opening in said duodenum the opposite ends of said probe will project from said bile duct and duodenum, respectively; elongated highly flexible members extending in longitudinal continuation of said probe and connected end to end one to the other and to the tip end of said probe; a multiplicity of normally expanded obstacle dislodging and entrapping elements spaced apart longitudinally on each of said members adapted to engage, dislodge and entrap an obstacle in the common bile duct when said members are drawn entirely through said duct; and means on the distal ends of said probe and endmost flexible member for applying pull and/or push force simultaneously to said members and thereby to said elements as effects successive contraction and expansion of the latter.

References Cited in the file of this patent

UNITED STATES PATENTS

| | | |
|---|---|---|
| 892,472 | Walker | July 7, 1908 |
| 894,198 | Funk | July, 28, 1908 |
| 1,612,697 | Cecil | Dec. 28, 1926 |
| 1,677,671 | Councill | July 17, 1928 |
| 2,556,783 | Wallace | June 12, 1951 |
| 2,649,092 | Wallace | Aug. 18, 1953 |
| 2,756,752 | Scherlis | July 31, 1956 |
| 2,918,919 | Wallace | Dec. 29, 1959 |
| 2,943,626 | Dormia | July 5, 1960 |
| 3,008,467 | Morris | Nov. 14, 1961 |

FOREIGN PATENTS

| | | |
|---|---|---|
| 90,190 | Switzerland | Aug. 1, 1921 |
| 195,566 | Austria | Feb. 10, 1958 |

OTHER REFERENCES

General Catalog of V. Mueller & Co., copyrighted 1938, page 292. Copy on file in Div. 55.